United States Patent
Avadhanula et al.

(10) Patent No.: US 11,216,254 B2
(45) Date of Patent: Jan. 4, 2022

(54) METHOD AND SYSTEM FOR AUTOMATED AND OPTIMIZED CODE GENERATION FOR CONTRADICTORY NON-FUNCTIONAL REQUIREMENTS (NFRS)

(71) Applicant: Tata Consultancy Services Limited, Mumbai (IN)

(72) Inventors: Yugesh Avadhanula, Hyderabad (IN); Satish Sreenivasaiah, Bangalore (IN); Deepthi Seshabattar, Hyderabad (IN); Sitaramabrahmam Gunturi, Hyderabad (IN)

(73) Assignee: Tata Consultancy Services Limited, Mumbai (IN)

( * ) Notice: Subject to any disclaimer, the term of this patent is extended or adjusted under 35 U.S.C. 154(b) by 0 days.

(21) Appl. No.: 17/062,395

(22) Filed: Oct. 2, 2020

(65) Prior Publication Data

US 2021/0103432 A1    Apr. 8, 2021

(30) Foreign Application Priority Data

Oct. 3, 2019    (IN) .............................. 201921040129

(51) Int. Cl.
*G06F 8/35* (2018.01)
*G06F 8/10* (2018.01)
(Continued)

(52) U.S. Cl.
CPC .................. *G06F 8/35* (2013.01); *G06F 8/10* (2013.01); *G06F 8/443* (2013.01); *G06F 21/577* (2013.01); *G06F 2221/033* (2013.01)

(58) Field of Classification Search
CPC ..... G06F 8/35; G06F 21/577; G06F 2221/033
(Continued)

(56) References Cited

U.S. PATENT DOCUMENTS 5,640,567 A * 6/1997 Phipps ...................... G06F 8/71
717/121
6,523,027 B1 * 2/2003 Underwood ............ G06F 9/465
(Continued)

OTHER PUBLICATIONS

Elghondakly et al, "Waterfall and Agile Requirements-based Model for Automated Test Cases Generation", IEEE, pp. 607-612 (Year: 2015).*

(Continued)

*Primary Examiner* — Anil Khatri
(74) *Attorney, Agent, or Firm* — Finnegan, Henderson, Farabow, Garrett & Dunner, LLP

(57) ABSTRACT

Majority of the existing approaches handling NFRs limit themselves to model analysis whereas the method disclosed herein includes model driven code generation for NFR optimized models. The method and system disclosed herein provides a model driven approach to contradictory NFR resolution, which generates the NFR code into the functional application code. Embodiments herein provide automated and optimized code generation for contradictory NFRs. The method uses separate but related NFR and mitigation models. Further performs model to code transformation only after the Mitigation model is calculated based on NFR models. The method relies on model to code transformation for generating the application code and other artifacts for an optimized NFR. The approach provided is applicable till the application is deployed in an optimized environment.

6 Claims, 8 Drawing Sheets

(51) Int. Cl.
*G06F 8/41* (2018.01)
*G06F 21/57* (2013.01)
(58) Field of Classification Search
USPC .................................................. 717/104–120
See application file for complete search history.

(56) References Cited

U.S. PATENT DOCUMENTS

| | | | | |
|---|---|---|---|---|
| 7,500,224 B2* | 3/2009 | Hejlsberg | ................ | G06F 8/51 717/106 |
| 7,971,194 B1* | 6/2011 | Gilboa | .................... | G06F 8/20 717/136 |
| 8,001,519 B2* | 8/2011 | Conallen | ................ | G06F 8/316 717/105 |
| 8,042,098 B2* | 10/2011 | Do | ............................ | G06F 8/20 717/123 |
| 8,312,419 B2* | 11/2012 | Wilcock | .................... | G06F 8/10 717/104 |
| 8,418,126 B2* | 4/2013 | Chaar | ...................... | G06F 8/20 717/104 |
| 8,549,514 B2* | 10/2013 | Carteri | ...................... | G06F 8/61 717/177 |
| 8,640,096 B2* | 1/2014 | Arcese | ................ | G06F 9/44505 717/121 |
| 8,752,003 B2* | 6/2014 | Salehi | .................... | G06Q 10/00 717/104 |
| 10,061,578 B2* | 8/2018 | Walsh | ....................... | G06F 8/20 |

OTHER PUBLICATIONS

Siegmund et al, "Measuring Non-functional Properties in Software Product Lines for Product Derivation", IEEE, pp. 187-194 (Year: 2008).*

Boussaa et al, "Automatic Non-functional Testing of Code Generators Families", ACM, pp. 202-212 (Year: 2016).*

Anne et al, "Think: View-Based Support of Non-Functional Properties in Embedded Systems", IEEE, pp. 147-156 (Year: 2009).*

Chung et al, "Dealing with Non-Functional Requirements: Three Experimental Studies of a Process Oriented Approach", ACM, pp. 25-37 (Year: 1995).*

Li et al, "Non-functional Requirements as Qualities, with a Spice of Ontology", IEEE, pp. 293-302 (Year: 2014).*

Thang, Nguyen Xuan et al., "Model-driven development with optimization of non-functional constraints in sensor network", ICSE Workshop on Software Engineering for Sensor Network Applications, 2010, pp. 61-65, ACM, https://kobra.uni-assel.de/bitstream/handle/123456789/2016062350479/ThesisNXThang.pdf?sequence=3&isAllowed=y.

Saadatmand, Mehrdad et al., "Toward Model-Based Trade-off Analysis of Non-Functional Requirements", Euromicro Conference on Software Engineering and Advanced Applications, 2012, IEEE, https://www.researchgate.net/publication/296467477_Model-Based_Trade-off_Analysis_of_Non-Functional_Requirements_An_Automated_UML-Based_Approach/link/56d5a61e08aeac0593335db6/download.

Saadatmand, Mehrdad et al., "A Fuzzy Decision Support Approach for Model-Based Tradeoff Analysis of Non-functional Requirements", International Conference on Information Technology—New Generations, 2015, IEEE, https://www.researchgate.net/publication/281593820_A_Fuzzy_Decision_Support_Approach_for_Model-Based_Tradeoff_Analysis_of_Non-Functional_Requirements/link/55ef577108aedecb68fda9da/download.

Zhang, Xuan et al., "Tradeoff Analysis for Conflicting Software Non-Functional Requirements", IEEE Access, Oct. 2019, IEEE, https://ieeexplore.ieee.org/stamp/stamp.jsp?tp=&arnumber=8880670.

* cited by examiner

METHOD AND SYSTEM FOR AUTOMATED AND OPTIMIZED CODE GENERATION FOR CONTRADICTORY NON-FUNCTIONAL REQUIREMENTS (NFRS)

PRIORITY CLAIM

The present application claims priority from Indian provisional patent application no 201921040129, filed on Oct. 3, 2019. The entire contents of the aforementioned application are incorporated herein by reference.

TECHNICAL FIELD

The disclosure herein generally relates to the field of automated code generation, and more particularly to automated and optimized code generation for contradictory Non-Functional Requirements (NFRs).

BACKGROUND

Technologies used currently generate code, rules or policies in a model driven format based on various models to automatically generate code of an application of interest. While generating code for application in consideration with a specific NFR model, it is critical to consider NFRs from all other aspects such as usability, performance, and the like. Specific NFR models could be a usability model, a threat or security model, a performance model, and the like. For example, while security model for a web application is being considered various security NFRs such as decision of whether to have a captcha on a web page, whether to have the auto fill feature enabled on a web page, 'remember me' in a login screen and so on need to be considered while generating code for the web application. However, it is critical that other NFR aspects say usability of the web application, need to be considered while considering the NFRs related to security aspect. The challenge is in incorporating those usability aspects that are contradictory to the security requirements. Inclusion of usability may compromise the security of the application to a certain or significant extent.

Thus, security solutions seldom consider the usability aspect, as both are usually conflicting and contradictory in nature. For example, a registration page or a user feedback survey of a web application with a Completely Automated Public Turing test to tell Computers and Humans Apart (Captcha) is one of the secure solutions to avoid Denial of Service (DoS) attacks but a more usable solution does not recommend the use of the Captcha on web screens as it is inconvenient to the end user. Incorporating application security manually from a design stage is popular but less practiced approach in building software products or applications. There are solutions in the market today for generating threat models or say usability models automatically, however only one NFR aspect is conventionally addressed at a time. In practical scenario, with the above security and usability NFR requirement, it can be understood that there are contradicting NFRs, which need to be addressed when a code for application is built.

Attempts have been made to address the contradictory NFRs for software applications such as in "Tradeoff Analysis for Conflicting Software Non-Functional Requirements", which follows a fuzzy, linear programming, microeconomic concept based approach and provides Conflicting NFRs Tradeoff Framework (CNTF), to take trade-off decisions for conflicting NFR's. Few other existing approaches address the contradicting NFRs but these approaches work in a UML modeling environment where Fuzzification, TOPSIS method, model to model and model to code transformation are used for NFR model analysis.

SUMMARY

Embodiments of the present disclosure present technological improvements as solutions to one or more of the above-mentioned technical problems recognized by the inventors in conventional systems. For example, in one embodiment, a method for automated and optimized code generation for contradictory Non-Functional Requirements (NFRs). The method comprises receiving, inputs from a user in accordance with a set of questions generated by an application context model to determine an application context of an application among a plurality of application contexts.

Further generating a set of NFR recommendations for the application in accordance to the application context based on a first set of predefined rules, wherein the set of NFR recommendations are associated with a plurality of NFR types corresponding to a plurality of NFR categories.

Further generating a NFR model by identifying a set of applicable NFR categories from the plurality of NFR categories and a corresponding set of applicable NFR types based on a second set of predefined rules, wherein the NFR model generates a set of applicable NFR aspects corresponding to the set of applicable NFR categories.

Furthermore generating a NFR weighable matrix, wherein plurality of elements of the NFR weighable matrix comprise a) weightage assigned to each NFR aspect from the set of applicable NFR aspects and b) quantifier defining rating in context of the weightage for each NFR aspect from the set of applicable NFR aspects in the NFR model of the application context, wherein the weightage is predefined user-modifiable value associated with each NFR aspects that defines criticality of each NFR aspect in the application context, and wherein the quantifier is user-modifiable measurement of each NFR aspect in the application context.

Furthermore identifying a set of NFR mitigations addressing each NFR aspect from the set of applicable NFR aspects using a NFR aspect to NFR Mitigation predefined mapping, wherein the set of NFR mitigations define a mitigation model and comprises a prioritized list of NFR mitigations derived based on a weighted set of applicable NFR aspects obtained by weighing the applicable NFR aspects by the NFR weighable matrix.

Further determining one or more contradictory NFR mitigations among the set of NFR mitigations, wherein the one or more contradictory NFR mitigations result from one or more contradictory NFR aspects present in the set of applicable NFR aspects, wherein the one or more contradictory NFR mitigations are obtained based on a predefined NFR mitigation to contradictory NFR mitigation mapping.

Thereafter generating an optimized mitigation model for the set of applicable NFR aspects by addressing the one or more contradictory NFR mitigations to determine a set of optimized NFR mitigations.

Further, generating an application code for the application using a set of application models by embedding the optimized mitigation model, wherein the set of application models are identified based on a set of functional requirements identified for the application.

Furthermore generating a build specification for the application with the set of optimized NFR mitigations, wherein the build specification is a script that includes instructions to a) compile or translate a code for the application, b) perform quality checks on the application, c) perform tests to assess functional or non-functional conformance of the application, and d) enables the deployment of the final executable code.

Furthermore, building the code using the build specification by incorporating set of optimized NFR mitigations.

In another aspect, a system for automated and optimized code generation for contradictory Non-Functional Requirements (NFRs), the system comprising: a memory storing instructions; one or more Input/Output (I/O) interfaces; and one or more hardware processors coupled to the memory via the one or more I/O interfaces, wherein the one or more hardware processors are configured by the instructions to receive, inputs from a user in accordance with a set of questions generated by an application context model to determine an application context of an application among a plurality of application contexts.

Further generate a set of NFR recommendations for the application in accordance to the application context based on a first set of predefined rules, wherein the set of NFR recommendations are associated with a plurality of NFR types corresponding to a plurality of NFR categories.

Further generate a NFR model by identifying a set of applicable NFR categories from the plurality of NFR categories and a corresponding set of applicable NFR types based on a second set of predefined rules, wherein the NFR model generates a set of applicable NFR aspects corresponding to the set of applicable NFR categories.

Furthermore generate a NFR weighable matrix, wherein plurality of elements of the NFR weighable matrix comprise a) weightage assigned to each NFR aspect from the set of applicable NFR aspects and b) quantifier defining rating in context of the weightage for each NFR aspect from the set of applicable NFR aspects in the NFR model of the application context, wherein the weightage is predefined user-modifiable value associated with each NFR aspects that defines criticality of each NFR aspect in the application context, and wherein the quantifier is user-modifiable measurement of each NFR aspect in the application context.

Furthermore identify a set of NFR mitigations addressing each NFR aspect from the set of applicable NFR aspects using a NFR aspect to NFR Mitigation predefined mapping, wherein the set of NFR mitigations define a mitigation model and comprises a prioritized list of NFR mitigations derived based on a weighted set of applicable NFR aspects obtained by weighing the applicable NFR aspects by the NFR weighable matrix.

Further determine one or more contradictory NFR mitigations among the set of NFR mitigations, wherein the one or more contradictory NFR mitigations result from one or more contradictory NFR aspects present in the set of applicable NFR aspects, wherein the one or more contradictory NFR mitigations are obtained based on a predefined NFR mitigation to contradictory NFR mitigation mapping.

Thereafter generate an optimized mitigation model for the set of applicable NFR aspects by addressing the one or more contradictory NFR mitigations to determine a set of optimized NFR mitigations.

Further generate an application code for the application using a set of application models by embedding the optimized mitigation model, wherein the set of application models are identified based on a set of functional requirements identified for the application;

Furthermore generate a build specification for the application with the set of optimized NFR mitigations, wherein the build specification is a script that includes instructions to a) compile or translate a code for the application, b) perform quality checks on the application, c) perform tests to assess functional or non-functional conformance of the application, and d) enables the deployment of the final executable code.

Furthermore, build the code using the build specification by incorporating set of optimized NFR mitigations.

In yet another aspect, there are provided one or more non-transitory machine-readable information storage mediums comprising one or more instructions, which when executed by one or more hardware processors causes a method for automated and optimized code generation for contradictory Non-Functional Requirements (NFRs). The method comprises receiving, inputs from a user in accordance with a set of questions generated by an application context model to determine an application context of an application among a plurality of application contexts.

Further generating a set of NFR recommendations for the application in accordance to the application context based on a first set of predefined rules, wherein the set of NFR recommendations are associated with a plurality of NFR types corresponding to a plurality of NFR categories.

Further generating a NFR model by identifying a set of applicable NFR categories from the plurality of NFR categories and a corresponding set of applicable NFR types based on a second set of predefined rules, wherein the NFR model generates a set of applicable NFR aspects corresponding to the set of applicable NFR categories.

Furthermore generating a NFR weighable matrix, wherein plurality of elements of the NFR weighable matrix comprise a) weightage assigned to each NFR aspect from the set of applicable NFR aspects and b) quantifier defining rating in context of the weightage for each NFR aspect from the set of applicable NFR aspects in the NFR model of the application context, wherein the weightage is predefined user-modifiable value associated with each NFR aspects that defines criticality of each NFR aspect in the application context, and wherein the quantifier is user-modifiable measurement of each NFR aspect in the application context.

Furthermore identifying a set of NFR mitigations addressing each NFR aspect from the set of applicable NFR aspects using a NFR aspect to NFR Mitigation predefined mapping, wherein the set of NFR mitigations define a mitigation model and comprises a prioritized list of NFR mitigations derived based on a weighted set of applicable NFR aspects obtained by weighing the applicable NFR aspects by the NFR weighable matrix.

Further determining one or more contradictory NFR mitigations among the set of NFR mitigations, wherein the one or more contradictory NFR mitigations result from one or more contradictory NFR aspects present in the set of applicable NFR aspects, wherein the one or more contradictory NFR mitigations are obtained based on a predefined NFR mitigation to contradictory NFR mitigation mapping.

Thereafter generating an optimized mitigation model for the set of applicable NFR aspects by addressing the one or more contradictory NFR mitigations to determine a set of optimized NFR mitigations.

Further generating an application code for the application using a set of application models by embedding the optimized mitigation model, wherein the set of application models are identified based on a set of functional requirements identified for the application;

Furthermore generating a build specification for the application with the set of optimized NFR mitigations, wherein the build specification is a script that includes instructions to a) compile or translate a code for the application, b) perform quality checks on the application, c) perform tests to assess functional or non-functional conformance of the application, and d) enables the deployment of the final executable code.

Furthermore, building the code using the build specification by incorporating set of optimized NFR mitigations.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

Figure 1A:
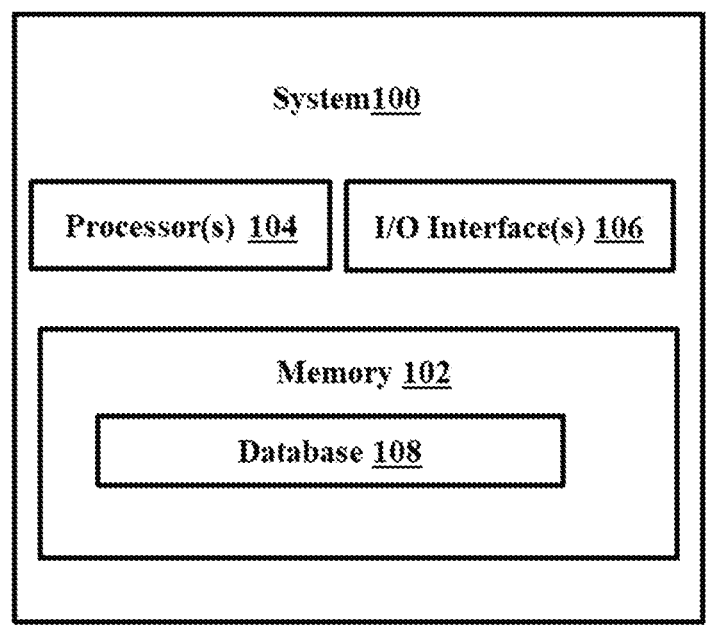
FIG. 1A is a functional block diagram of a system for automated and optimized code generation for an application by considering contradictory Non-Functional Requirements (NFRs) using an mitigation model, in accordance with some embodiments of the present disclosure.

It should be appreciated by those skilled in the art that any block diagrams herein represent conceptual views of illustrative systems and devices embodying the principles of the present subject matter. Similarly, it will be appreciated that any flow charts, flow diagrams, and the like represent various processes which may be substantially represented in computer readable medium and so executed by a computer or processor, whether or not such computer or processor is explicitly shown.

DETAILED DESCRIPTION OF EMBODIMENTS

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the claims.

The embodiments herein provide a system and method for automated and optimized code generation for an application by considering contradictory Non-Functional Requirements (NFRs) using a mitigation model.

Majority of the existing approaches handling NFRs limit themselves to model analysis whereas the method disclosed herein includes model driven code generation for NFR optimized models. The method disclosed herein provides a model driven approach to contradictory NFR resolution, which generates the NFR code into the functional application code. The method uses separate but related NFR and mitigation models, wherein each Non-Functional Requirement (NFR) has one or more mitigations associated to it that describe how the NFR is addressed. Further, the method performs model to code transformation only after the mitigation model is calculated based on NFR models. The method relies on model to code transformation for generating the application code and other artifacts for an optimized NFR. Unlike existing methods, the approach disclosed herein is applicable till the application is deployed in an optimized environment.

Referring now to the drawings, and more particularly to FIG. 1A through FIG. 4C, where similar reference characters denote corresponding features consistently throughout the figures, there are shown preferred embodiments and these embodiments are described in the context of the following exemplary system and/or method.

FIG. 1A is a functional block diagram of a system 100 for automated and optimized code generation for an application by considering contradictory Non-Functional Requirements (NFRs) using a mitigation model in accordance with some embodiments of the present disclosure.

In an embodiment, the system 100 includes a processor(s) 104, communication interface device(s), alternatively referred as input/output (I/O) interface(s) 106, and one or more data storage devices or a memory 102 operatively coupled to the processor(s) 104. The system 100 with one or more hardware processors is configured to execute functions of one or more functional blocks of the FIG. 1A and FIG. 1B. Referring to the components of heart sensing device 104, in an embodiment, the processor(s) 104, can be one or more hardware processors 104. In an embodiment, the one or more hardware processors 104 can be implemented as one or more microprocessors, microcomputers, microcontrollers, digital signal processors, central processing units, state machines, logic circuitries, and/or any devices that manipulate signals based on operational instructions. Among other capabilities, the one or more hardware processors 104 are configured to fetch and execute computer-readable instructions stored in the memory 102. In an embodiment, the system 100 can be implemented in a variety of computing systems including laptop computers, notebooks, hand-held devices such as mobile phones, workstations, mainframe computers, servers, a network cloud, and the like.

The I/O interface(s) 106 can include a variety of software and hardware interfaces, for example, a web interface, a graphical user interface, a touch user interface (TUI), interfaces for the receiving inputs/responses from user to automatically identify application context of an application of interest, for which a code is to be generated automatically by addressing the NFRs along with the contradictory NFRs required by the application. Any additional user inputs such as weightages of NFR matrix and the like can be received via the I/O interface 106. The I/O Interface can facilitate multiple communications within a wide variety of networks N/W and protocol types, including wired networks, for example, LAN, cable, etc., and wireless networks, such as WLAN, cellular, or satellite. In an embodiment, the I/O interface (s) 106 can include one or more ports for connecting a number of devices (nodes) of the heart sensing device to one another or to another server.

The memory 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes.

Further, the memory 102 may include a database 108, which may store information pertaining to input(s)/output(s) of each step performed by the processor(s) 104 of the system 100 and methods of the present disclosure. For example, database a) a first set of predefined rules for generating a set of NFR recommendations for the application in accordance with the application context, b) a second set of predefined rules for generating a NFR model by identifying a set of applicable NFR categories from the plurality of NFR categories and a corresponding set of applicable NFR types, c) a NFR weighable matrix, d) a set of NFR mitigations, e) one or more contradictory mitigations identified for the application context, f) an optimized mitigation model, g) a NFR Aspect to NFR Mitigation predefined mapping, h) a predefined NFR mitigation to contradictory NFR mitigation mapping and the like.

In an embodiment, the database 108 may be external (not shown) to the system 100 and coupled to the system 100 via the I/O interface 106. Functions of the components of system 100 are explained in conjunction with FIG. 1B, FIG. 2 and flow diagram of FIG. 3A through FIG. 4C.

Figure 1B:
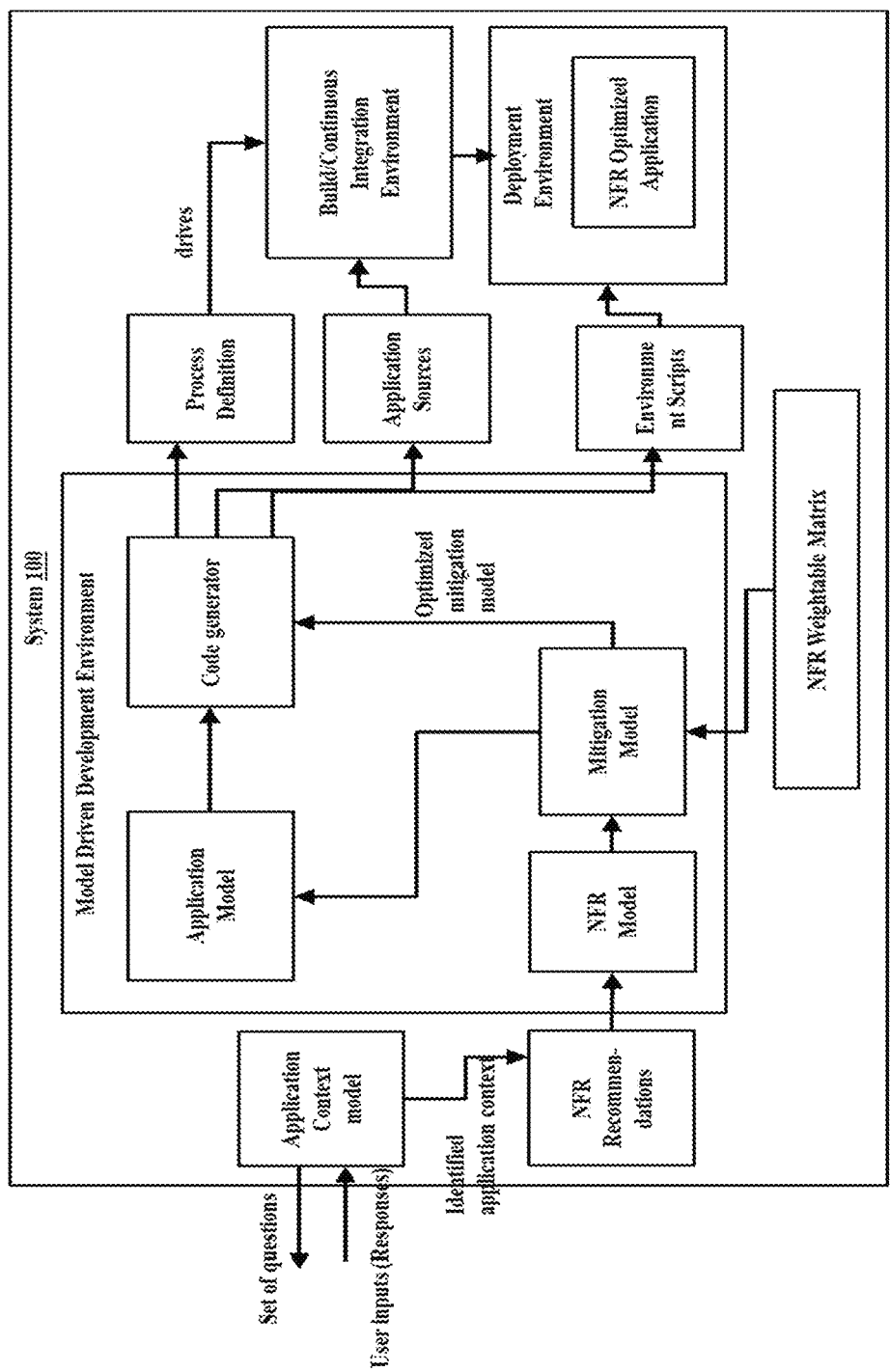
FIG. 1B illustrates an architectural diagram of the system of FIG. 1A providing automated and optimized code generation for the application by considering contradictory Non-Functional Requirements (NFRs) using the mitigation model, in accordance with some embodiments of the present disclosure.

FIG. 1B illustrates an architectural diagram of the system 100 providing automated and optimized code generation for an application by considering contradictory Non-Functional Requirements (NFRs) using the mitigation model, in accordance with some embodiments of the present disclosure.

An example system 100 herein depicts components of the system 100 for automated and optimized code generation for the application by considering contradictory Non-Functional Requirements (NFRs) such as security, usability, and performance. However, the system 100 can be extended to automated and optimized code generation for the application for any other NFRs still being within the scope of the system disclosed herein.

Referring to components depicted in the architecture of the system 100 in FIG. 1B, an application code is generated from application models that are technology agnostic specifications created from application requirements. The application model contains application components such as classes, packages, operations, queries and so on. Similar to application models, based on NFR requirements, for example herein, the security and the usability requirements, NFR models such as a threat model and a usability model are also created, respectively. The structure of these models are designed based on the best practices and guidelines for creating secure and usable applications of different types covering a broad range of domains. Then present disclosure internally constructs a mitigation model based on the NFR requirements for the application context of the application of interest. For example, NFR requirements of security and usability are defined by a threat model and a usability model. The mitigation model comprises a prioritized list of NFR mitigations derived based on a weighted set of applicable NFR aspects obtained by weighing the applicable NFR aspects by the NFR weighable matrix. The mitigation model contains details of mitigations to be incorporated into the generated application such as encryption, authentication, and so on and the associated tools to implement the mitigations wherever applicable while maintaining a fine balance with usability. Further, the mitigation model so identified for the application is refined or optimized to addressing one or more contradictory mitigations to generate the optimized mitigation model Based on the application model and the optimized mitigation model, for security and usability NFR aspect in example herein, a code generator generates four items: (i) application code with secure usability, (ii) a build script, (iii) a set of metrics that quantify the robustness of applications security and (iv) a set of scripts to ensure security of the applications deployment environment. The build script contains definition for a continuous integration pipeline incorporating the necessary checks to validate and enforce security during the application build and packaging. This pipeline incorporates mitigation tools wherever applicable based on the optimized mitigation model. A continuous integration tool imports this pipeline definition and with the generated application code as the input drives the continuous integration and deployment of the application.

a) Application Model, which represents a set of application models-Application model contains the elements of an application such as classes, attributes, operations, services, user interface elements, mappings and the relationships between them in a technology independent manner. Application model is based on a meta-model that serves as a blueprint for the application. The set of application models are identified based on a set of functional requirements identified for the application.

b) Application Context—Application Context contains the details like the type of application; whether it is a standalone application or an Internet based application, the domain in which the application operates; i.e., Banking, Retails, Insurance, etc., and so on. These details are used to identify the Non-functional requirements and recommendations applicable to the application. The user of the system specifies this information.

c) NFR Recommendations—Based on the application context a set of

Non-functional recommendations corresponding to different NFR Types such as Authentication, Authorization, Confidentiality are identified from a predefined set of types using the first set of predefined rules identified by an subject matter expert (SME). Each of the NFR type corresponds to a NFR category like Security, Usability and so on. NFR recommendations describe at a high level, the NFR Aspects to be included in the application based on its context. An example NFR recommendation is to use a password policy.

d) NFR Model—is generated by identifying a set of applicable NFR categories from the plurality of NFR categories (such as security and usability mentioned herein as example) and a corresponding set of applicable NFR types based on the set of second predefined rules. The rules are predefined by the SME. The NFR model generates a set of applicable NFR aspects corresponding to the set of applicable NFR categories. The NFR Model contains a structured representation of NFR aspects and the NFR types. NFR aspects are derived from the NFR recommendations identified in the previous step. Each NFR aspect belongs to an NFR Type. For example, NFR Aspects Password Policy and Authentication Methods belong to the NFR type Authentication. An NFR aspect contains three properties: priority and weightage which and characterize the NFR aspect's criticality and a quantifier.

e) Mitigation Model—Mitigation model consists of the set of mitigations identified for the NFR model. A mitigation, interchangeably referred as NFR mitigation, is a measure applied in code or configuration to satisfy an NFR aspect. The type of mitigation applied to an NFR aspect depends on the application context, the NFR Aspect and its weightage. Mitigation model serves as a basis for the Optimized Security code generation. An example of a mitigation is to implement a Password Policy with at least one special character, at least one capital letter, with a password length of 10. One mitigation may contradict one of more mitigations of a different NFR category. For example, for the above password policy mitigation, a contradicting mitigation from usability would be to use an easy to remember password.

f) An extensible database—The extensible database, which is component of the database 108, contains an exhaustive list of application domains, their corresponding categories, sub-categories, and application types, different NFR types, NFR aspects and Mitigations. This database also contains mapping data to associate different NFR types to an NFR category, NFR aspects to an NFR type, Weightages and Mitigations to an NFR aspect based on the Application Context. This information will be periodically updated based on the observations made on the different types of applications running in production in various application domains. NFR model and corresponding mitigation model are created based on this data. These models are further modified by the user of the system, following which a final optimized mitigation model is arrived at. This mitigation model is applied to various model elements in the application model such as a class attribute, class, operation, user interface screen, a user interface control such as a text box, etc.

g) Model Driven Framework—Model driven framework includes meta-models for application, NFR and mitigation models. The framework contains an interface to define application and NFR models and code generator to generate optimized application code and process definition based on the application and mitigation models.

h) Code generator—generates optimized application code for the application of interest, and process definition based on the application and optimized mitigation model. The code generator utilizes a set of application models by embedding the optimized mitigation model i) Application Sources—Application code enhanced with NFR mitigations is the output of the code generation process. This code undergoes checks and further transformations, build and packaging.

j) Process Definition—Process definition includes a plurality of configurations generated by the code generator. Process Definition contains the necessary configuration to scan, transform, build, and package the NFR-optimized application deployable using the application code as input.

k) Environment Scripts—These are a plurality of scripts to incorporate any required NFR mitigations in the environment in which the application gets deployed and runs. For example, if the deployment environment is a Linux operating system, a script can be used to enable SELinux. Build/Continuous Integration Environment—This environment contains a plurality of continuous integration and build tools that consume the process definition to scan, transform the application code, build it, and package it into a deployable.

l) NFR Optimized Application—This is the output of the Build/Continuous Integration environment. This application will be deployed in the optimized deployment environment.

Figure 2:
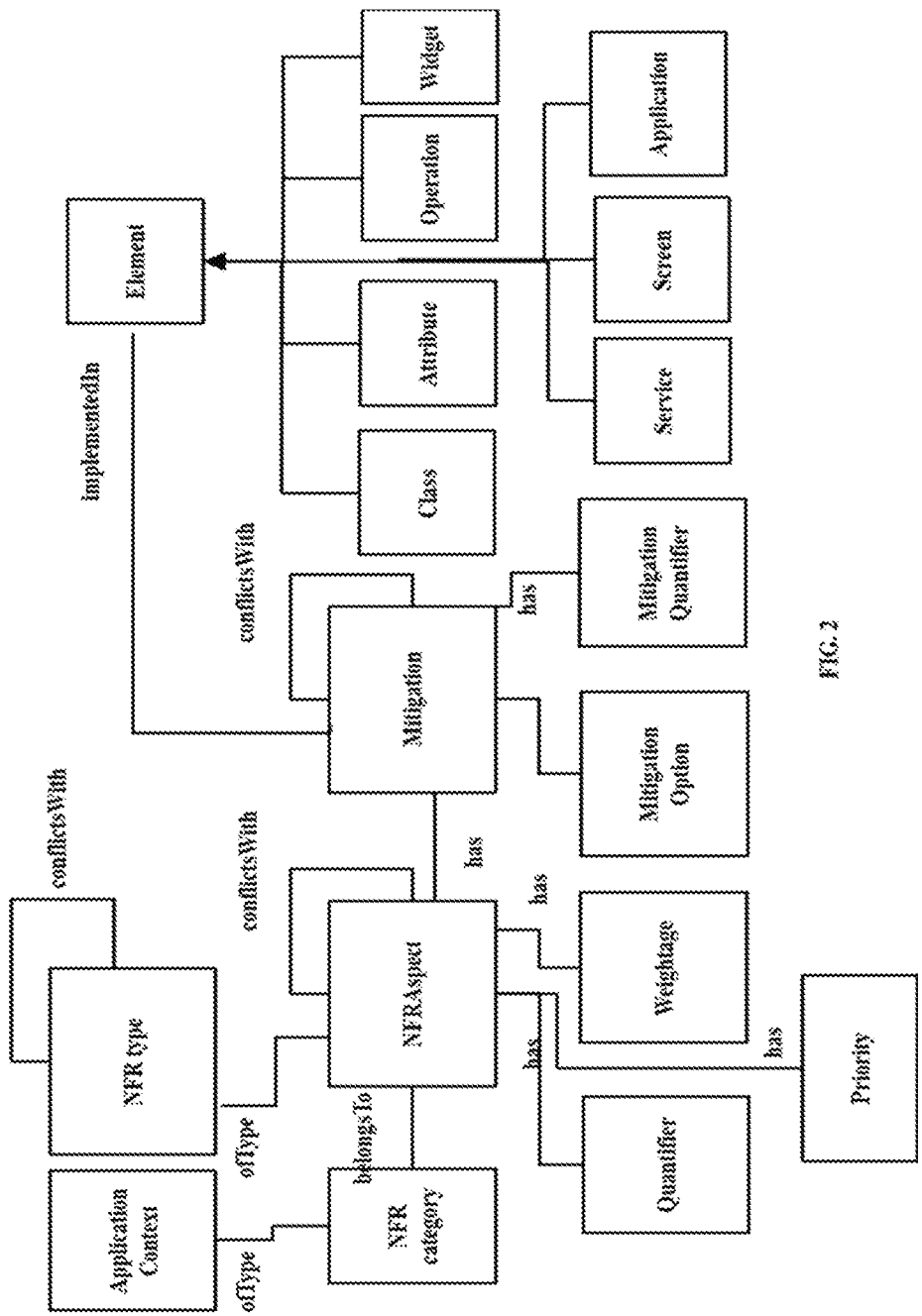
FIG. 2 illustrates a structural flow to generate the mitigation model for the application, in accordance with some embodiments of the present disclosure.

FIG. 2 illustrates a structural flow to generate the mitigation model for an application, in accordance with some embodiments of the present disclosure. FIG. 2 illustrates the elements required to capture NFR aspects and Mitigations and their relationships. Mitigations are identified based on NFR aspects and the Application Context. The mitigations (NFR mitigations) are applied on different types of application elements, which form the Application Model, all of which are model Elements. Code generator generates the optimized NFR model applied on to the Application model resulting in application source code, process definition and environment scripts for building and deploying the application in an optimized environment.

Figure 3A:
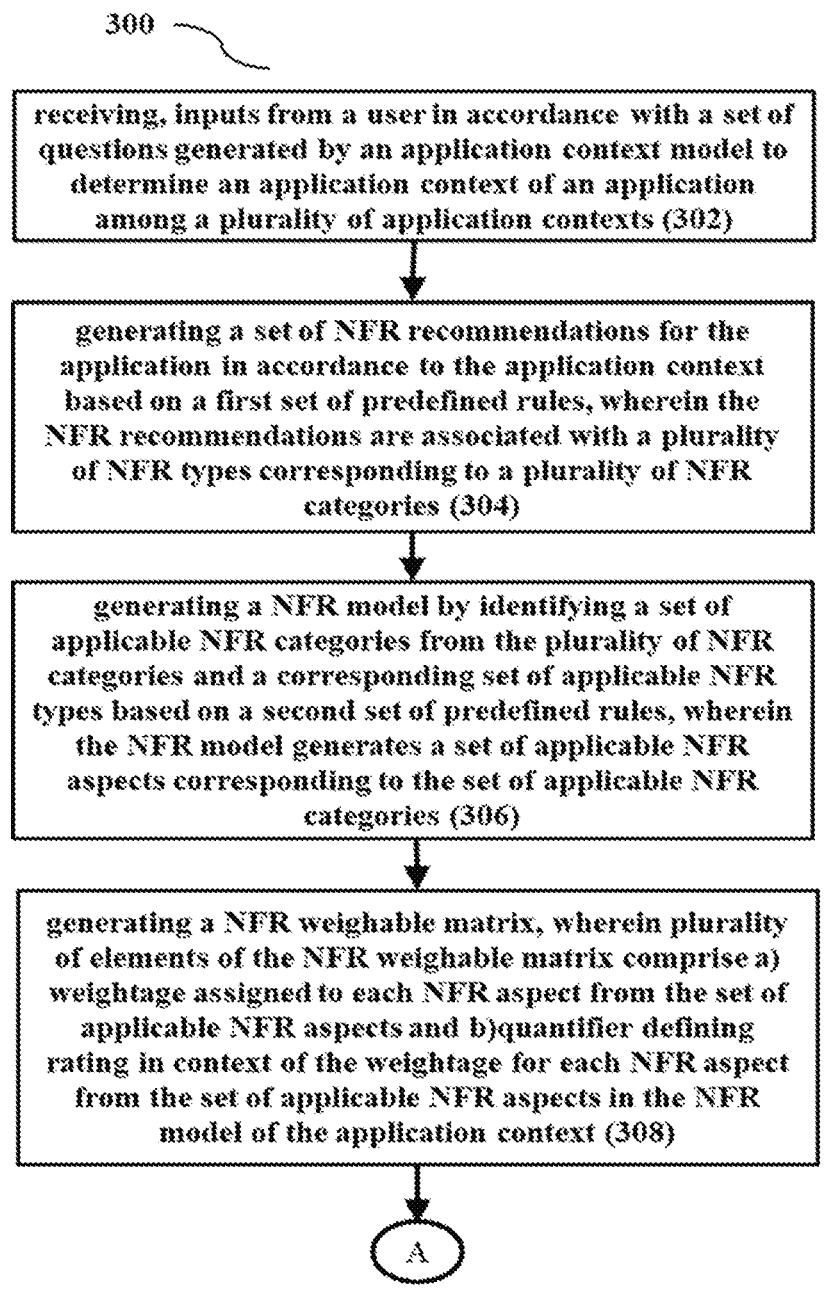
FIGS 3A and 3B is a flowchart illustrating a method for automated and optimized code generation for the application by considering the contradictory Non-Functional Requirements (NFRs) using the mitigation model, in accordance with some embodiments of the present disclosure.
Figure 3B:
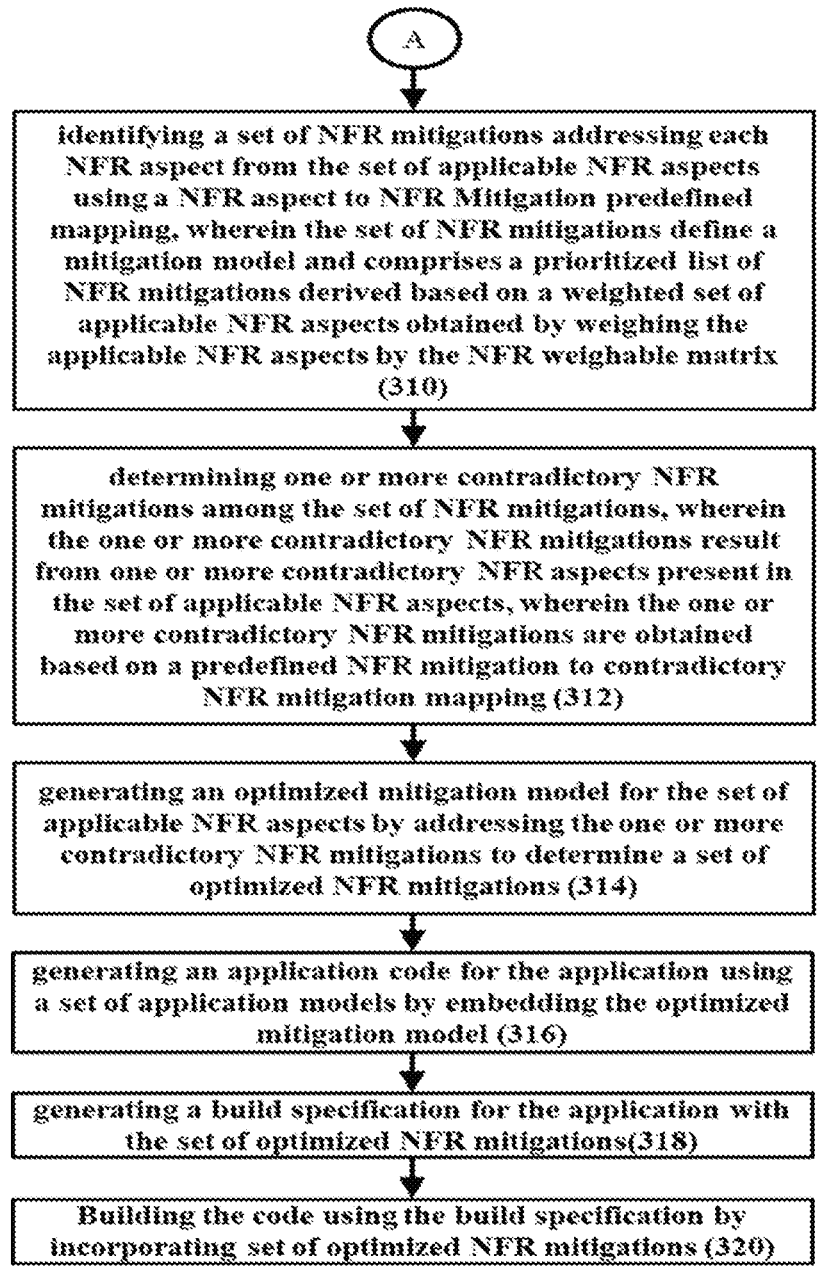

FIG. 3 is a flowchart illustrating a method 300 for automated and optimized code generation for the application by considering the contradictory Non-Functional Requirements (NFRs) using the mitigation model of system of FIG. 1, in accordance with some embodiments of the present disclosure.

In an embodiment, the system 100 comprises one or more data storage devices or the memory 102 operatively coupled to the processor(s) 104 and is configured to store instructions for execution of steps of the method 300 by the processor(s) or one or more hardware processors 104. The steps of the method 300 of the present disclosure will now be explained with reference to the components or blocks of the system 100 in FIGS. 1A and 1B and the steps of flow diagram as depicted in FIG. 3A through FIG. 4C. Although process steps, method steps, techniques or the like may be described in a sequential order, such processes, methods and techniques may be configured to work in alternate orders. In other words, any sequence or order of steps that may be described does not necessarily indicate a requirement that the steps to be performed in that order. The steps of processes described herein may be performed in any order practical. Further, some steps may be performed simultaneously.

Referring now to steps of method 300, receive inputs from a user in accordance with a set of questions, which are generated by an application context model. The response to the set of questions enable determine an at step 302 of the method 300 the one or more hardware processors 104 are configured to application context of an application among a plurality of application contexts defined in the system 100. Example question1: What is your application domain?: Response: Banking Example question2: What is the type of application been developed?:
Response: Web based application.
Thus, application context in example herein can be identified by the system 100 as web based Banking application.

Once the application context is identified, at step 304 of the method 300 the one or more hardware processors 104 are configured to generate a set of NFR recommendations for the application in accordance to the application context based on the first set of predefined rules. wherein the NFR recommendations are associated with a plurality of NFR types corresponding to a plurality of NFR categories. An example rule can be: "If the application domain is banking, security followed by usability, and performance are important NFR types to be considered and the corresponding NFR recommendations (like multi factor authentication, ease of access, etc.) apply in a specific order."

An example NFR type for the banking application can be: security, and one possible NFR recommendation can be: users must be authenticated with 2 factor authentication.

Another suggested NFR type can be usability and corresponding recommendation be: user should be able to log in with minimum number of mouse clicks and application must be easily accessible to visually impaired.

At step 306 of the method 300 the one or more hardware processors 104 are configured to generate the NFR model by identifying a set of applicable NFR categories from the plurality of NFR categories and a corresponding set of applicable NFR types based on the second set of predefined rules. The NFR model generates a set of applicable NFR aspects corresponding to the set of applicable NFR categories. NFR aspect for the NFR recommendation in 'security type' is 'two factor authentication', for 'usability' it can be 'login to application with few mouse clicks' and 'simplified authentication'

At step 308 of the method 300 the one or more hardware processors 104 are configured to generate the NFR weighable matrix, wherein plurality of elements of the NFR weighable matrix comprise a) weightage assigned to each NFR aspect from the set of applicable NFR aspects and b) quantifier defining rating in context of the weightage for each NFR aspect from the set of applicable NFR aspects in the NFR model of the application context. The weightage is predefined user-modifiable value associated with each NFR aspects that defines criticality of each NFR aspect in the application context. Further, the quantifier is user-modifiable measurement of each NFR aspect in the application context. Thus, weightage is the importance of a particular characteristic in a given application context and quantifier is what gets assigned to that particular NFR.

For example, in the context of Banking, NFR aspect Two factor Authentication can have a weightage of 8 out of 10. NFR aspect Ease of access for visually disabled for the same context can have a weightage of 5 out of 10.

At step 310 of the method 300 the one or more hardware processors 104 are configured to identify a set of NFR mitigations addressing each NFR aspect from the set of applicable NFR aspects using the NFR aspect to NFR Mitigation predefined mapping. The set of NFR mitigations define a mitigation model and comprises a prioritized list of NFR mitigations derived based on a weighted set of applicable NFR aspects obtained by weighing the applicable NFR aspects by the NFR weighable matrix. For the NFR Aspect 'two factor authentication', one NFR Mitigation can be 'password and captcha/token based authentication' and another one could be 'password based and SMS based authentication'.

The NFR model and the mitigation model is obtained based on information stored in the database 108, wherein the information comprises:
a) an exhaustive list of application domains, corresponding application categories and sub-categories and application types;
b) the plurality of NFR types, the plurality of NFR aspects corresponding to each of the plurality of NFR types and a plurality of NFR mitigations for each of the plurality of NFR aspects based on each of the plurality of application contexts;
c) weightages assigned to the plurality of NFR aspects corresponding to each of the plurality of application contexts; and
d) one or more NFR mitigations corresponding to each of the plurality of NFR aspects.

At step 312 of the method 300 the one or more hardware processors 104 are configured to determine one or more contradictory NFR mitigations among the set of NFR mitigations. The one or more contradictory NFR mitigations result from one or more contradictory NFR aspects present in the set of applicable NFR aspects. The one or more contradictory NFR mitigations are obtained based on a predefined NFR mitigation to contradictory NFR mitigation mapping.

NFR Aspect '2 factor authentication (captcha/token)' conflicts with 'simplified access for visually impaired'. Since the weightage of '2 factor authentication' is greater than 'usability' so authentication is implemented and usability is ignored.

At step 314 of the method 300 the one or more hardware processors 104 are configured to generate an optimized mitigation model for the set of applicable NFR aspects by addressing the one or more contradictory NFR mitigations to determine a set of optimized NFR mitigations, interchangeably referred as optimal set of mitigations. The step of generating the optimized mitigation model providing the set of optimized NFR mitigations comprises:
a) identifying one or more prioritized NFR mitigations from one or more contradictory NFR mitigations based on the relative criticality of the contradictory mitigations in the NFR type and a comparison of priorities and weightages for the contradictory NFR mitigations;
b) determining the set of NFR mitigations for the set of applicable NFRs;
c) identifying the one or more contradictory mitigations resulting from the one or more contradictory NFR aspects for the application context; and
d) adding one or more non-contradictory mitigations to the set of NFR mitigations to generate the set of optimized NFR mitigations.

At step 316 of the method 300 the one or more hardware processors 104 are configured to generate an application code for the application using the set of application models by embedding the optimized mitigation model. The set of application models are identified based on a set of functional requirements identified for the application.

At step 318 of the method 300 the one or more hardware processors 104 are configured to generate a build specification for the application with the set of optimized NFR mitigations. The build specification is a script that includes instructions to a) compile or translate a code for the application, b) perform quality checks on the application, c) perform tests to assess functional or non-functional conformance of the application and d) and enables the deployment of the final executable code in NFR optimized environment.

At step 320 of the method 300 the one or more hardware processors 104 are configured to build the code using the build specification by incorporating set of optimized NFR mitigations.

Figure 4A:
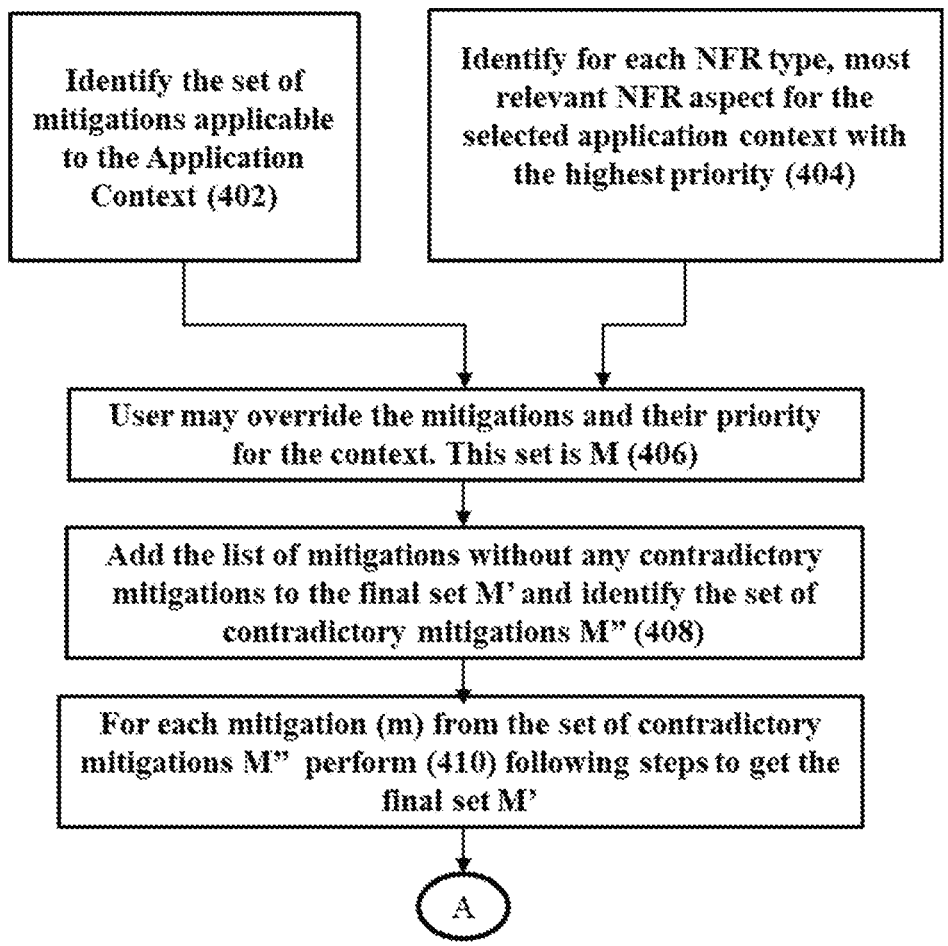
FIG. 4A through FIG. 4C depict a flow diagram illustrating process steps to identify optimal set of mitigations based on Context, Priority, Weightage, Quantifier, and user preferences, in accordance with some embodiments of the present disclosure.
Figure 4B:
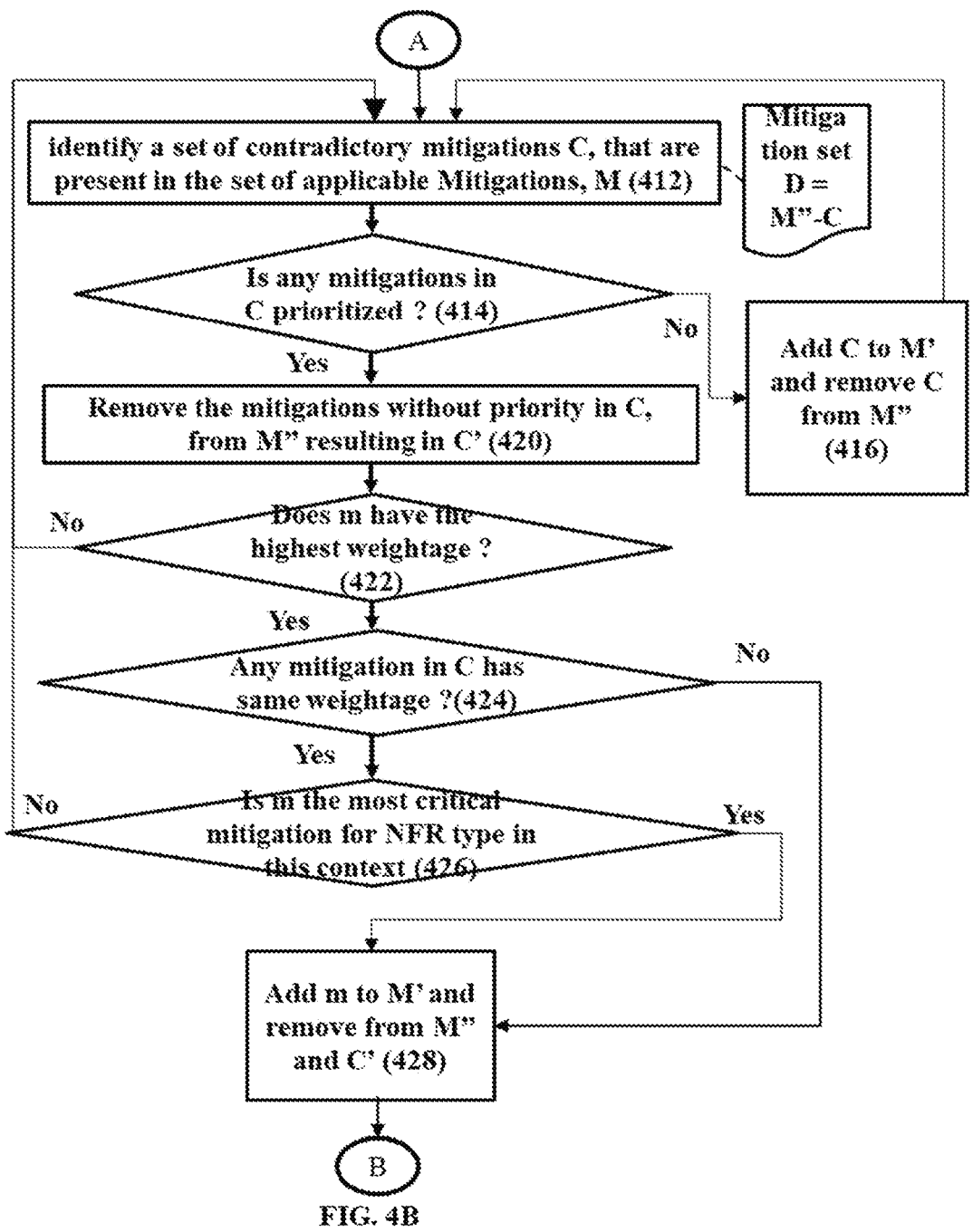
Figure 4C:
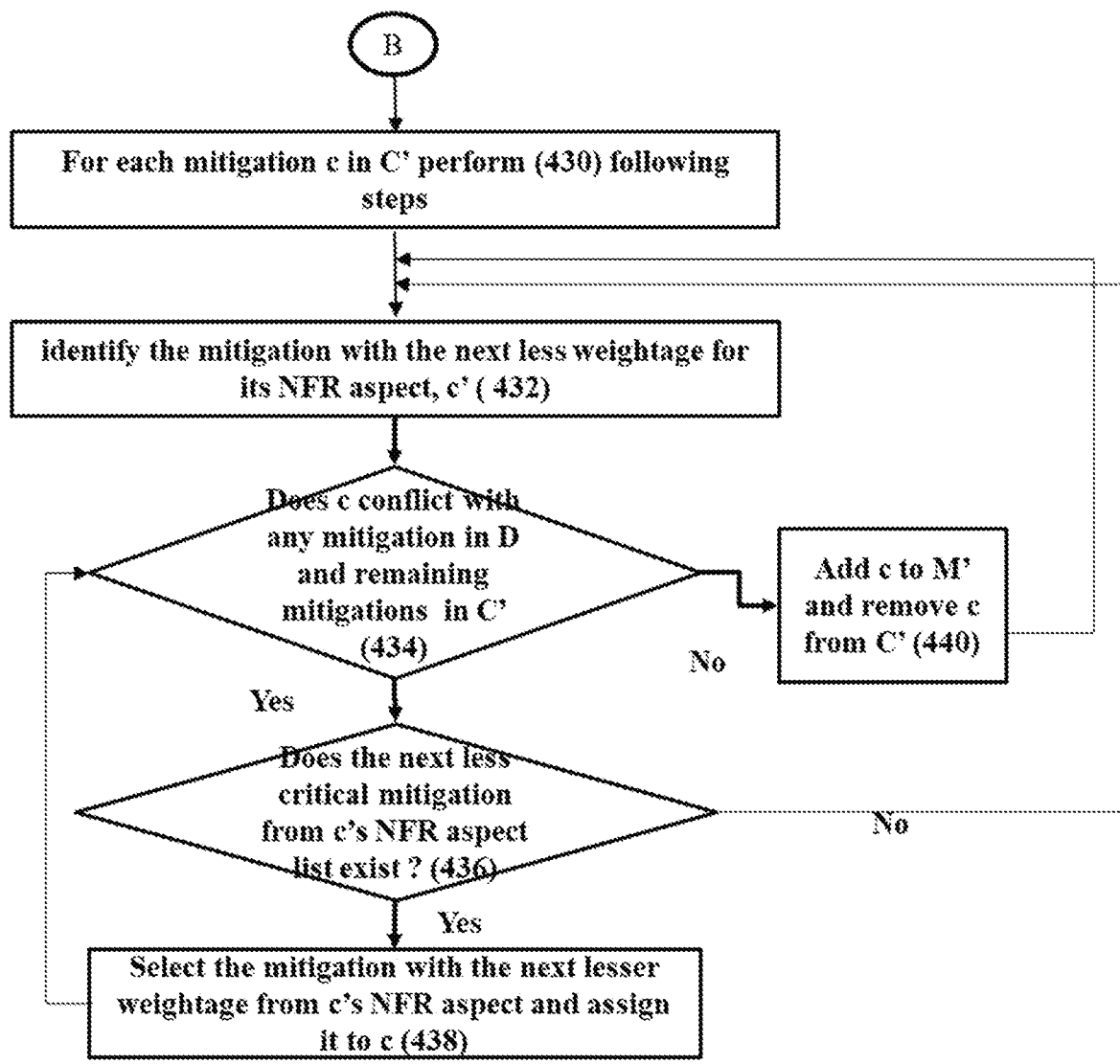

FIGS. 4A through 4C depict a flow diagram 400 illustrating process steps to identify optimal set of mitigations, (optimized NFR mitigations) based on Context, Priority, Weightage, Quantifier, and user preference, in accordance with some embodiments of the present disclosure.

The sub steps of step 314 steps to identify optimal set of mitigations include: Identify the set of mitigations applicable to the Application Context (402). Identify for each NFR type, most relevant NFR aspect for the selected application context with the highest priority (404). User may override the mitigations and their priority for the application context. This set is M (406). Add the list of mitigations without any contradictory mitigations to the final set M' and identify the set of contradictory mitigations M" (408). For each mitigation (m) from the set of contradictory mitigations M" perform (410) following steps 412 to 440 to get the final set M' of optimized NFR mitigations (mitigations).

Identify a set of contradictory mitigations C, that are present in the set of applicable Mitigations, M (412), wherein Mitigation set D=M"–C. Check if is any mitigations in C prioritized (414). If no, add C to M' and remove C from M" (416). If yes, remove the mitigations without priority in C, from M" resulting in C' (420). Check if m has the highest weightage (422). If no, go to step 412 to identify a set of contradictory mitigations C, which are present in the set of applicable Mitigations, M. If yes, check if any mitigation in C has same weightage (424). If no, add m to M' and remove from M" and C' (428). If yes, check if m is the most critical mitigation for NFR type in this context (426). If yes, Add m to M' and remove from M" and C' (428). If no, go back to step 412 to identify a set of contradictory mitigations C, that are present in the set of applicable Mitigations, M.

Further, for each mitigation c in C' perform (430) following steps: Identify the mitigation with the next less weightage for its NFR aspect, c' (432). Check if c conflicts with any mitigation in D and remaining mitigations in C' (434). If no, add c to M' and remove c from C' (440). If yes, check if the next less critical mitigation from c's NFR aspect list exist (436). If no, go back to step 432 for identify the mitigation with the next less weightage for its NFR aspect, c'. If yes, select the mitigation with the next lesser weightage from c's NFR aspect and assign it to c (438). Then Add c to M' and remove c from C' (440).

For example, user has selected a web-based internet-facing Banking application as the application context. Correspondingly, Security and Usability are identified as applicable NFR categories. In NFR Category Security, Authentication and Authorization are identified as the applicable NFR Types. Password policy, "Authentication Methods", "Captcha" are identified as NFR aspects under Authentication. In NFR Category Usability, Operability and Accessibility are identified as the applicable NFR types. Under Accessibility, "Target User Audience" is identified as the applicable NFR Aspect. This NFR Aspect is in conflict with the "Captcha" NFR Aspect under Authentication. However, for the application's context "Captcha" is the prioritized NFR aspect. So, the default Mitigation Model includes the Mitigation for "Captcha" with the captcha complexity decided by its weightage which is maximum (10 out of 10) for the application context.

Suppose the system user marks the "Target User Audience" NFR Aspect as prioritized. In this case, the weightage for "Target User Audience", which is 7, is less than the weightage for "Captcha" which is 10 for the application context. So "Captcha" is included in the Mitigation model. However, Target User Audience is also prioritized. So, if a mitigation for "Target User Audience" with a weightage less than 7 exists and if it is not conflicting with any other mitigations in the mitigation model, it will be included in the mitigation model.

As can be understood by person having ordinary skill in the art, the examples provided throughout the description are indicative/illustrative. However, in real time/practical implementations will be modified as per the user requirements.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software modules located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims (when included in the specification), the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method for automated and optimized code generation for contradictory Non-Functional Requirements (NFRs), the method comprising:
   receiving, by one or more hardware processors, inputs from a user in accordance with a set of questions generated by an application context model to determine an application context among a plurality of application contexts of an application;
   generating, by the one or more hardware processors, a set of NFR recommendations for the application in accordance to the application context based on a first set of predefined rules, wherein the set of NFR recommendations is associated with a plurality of NFR types corresponding to a plurality of NFR categories;
   generating, by the one or more hardware processors, a NFR model by identifying a set of applicable NFR categories from the plurality of NFR categories and a corresponding set of applicable NFR types based on a second set of predefined rules, wherein the NFR model generates a set of applicable NFR aspects corresponding to the set of applicable NFR categories;
   generating by the one or more hardware processors, a NFR weighable matrix, wherein plurality of elements of the NFR weighable matrix comprise a) weightage assigned to each NFR aspect from the set of applicable NFR aspects and b) quantifier defining rating in context of the weightage for each NFR aspect from the set of applicable NFR aspects in the NFR model of the application context, wherein the weightage is predefined user-modifiable value associated with each NFR aspects that defines criticality of each NFR aspect in the application context, and wherein the quantifier is user-modifiable measurement of each NFR aspect in the application context;
   identifying by the one or more hardware processors, a set of NFR mitigations addressing each NFR aspect from the set of applicable NFR aspects using a NFR aspect to NFR Mitigation predefined mapping, wherein the set of NFR mitigations define a mitigation model and comprises a prioritized list of NFR mitigations derived based on a weighted set of applicable NFR aspects obtained by weighing the applicable NFR aspects by the NFR weighable matrix;
   determining by the one or more hardware processors, one or more contradictory NFR mitigations among the set of NFR mitigations, wherein the one or more contradictory NFR mitigations result from one or more contradictory NFR aspects present in the set of applicable NFR aspects, wherein the one or more contradictory NFR mitigations are obtained based on a predefined NFR mitigation to contradictory NFR mitigation mapping;
   generating, by the one or more hardware processors, an optimized mitigation model for the set of applicable NFR aspects by addressing the one or more contradictory NFR mitigations to determine a set of optimized NFR mitigations;
   generating, by the one or more hardware processors, an application code for the application using a set of application models by embedding the optimized mitigation model, wherein the set of application models are identified based on a set of functional requirements identified for the application;
   generating, by the one or more hardware processors, a build specification for the application with the set of optimized NFR mitigations, wherein the build specification is a script that includes instructions to a) compile or translate a code for the application, b) perform quality checks on the application, c) perform tests to assess functional or non-functional conformance of the application, and d) enables the deployment of the final executable code; and
   building, by the one or more hardware processors, the code using the build specification by incorporating set of optimized NFR mitigations;
   wherein addressing one or more contradictory NFR mitigations resulting from the one or more contradictory NFR aspects present in the set of applicable NFRs to generate the optimized mitigation model providing the set of optimized NFR mitigations comprises: identifying one or more prioritized NFR mitigations from one or more contradictory NFR mitigations based on the relative criticality of the contradictory mitigations in the NFR type and a comparison of priorities and weightages for the contradictory NFR mitigations;
   determining the set of NFR mitigations for the set of applicable NFRs;
   identifying the one or more contradictory mitigations resulting from the one or more contradictory NFR aspects for the application context; and
   adding one or more non-contradictory mitigations to the set of NFR mitigations to generate the set of optimized NFR mitigations.

2. The method of claim 1, wherein the NFR model and the mitigation model are obtained based on information stored in a database, wherein the information comprises:
   an exhaustive list of application domains, corresponding application categories and sub-categories and application types;
   the plurality of NFR types, the plurality of NFR aspects corresponding to each of the plurality of NFR types and a plurality of NFR mitigations for each of the plurality of NFR aspects based on each of the plurality of application contexts;
   weightages assigned to the plurality of NFR aspects corresponding to each of the plurality of application contexts; and
   one or more NFR mitigations corresponding to each of the plurality of NFR aspects.

3. A system for automated and optimized code generation for contradictory Non-Functional Requirements (NFRs), the system comprising:
   a memory storing instructions;
   one or more Input/output (I/O) interfaces; and one or more hardware processors coupled to the memory via the one or more I/O interfaces wherein the one or more hardware processors are configured by the instructions to:

receive inputs from a user in accordance with a set of questions generated by an application context model to determine an application context, among a plurality of application contexts, of an application;

generate a set of NFR recommendations for the application in accordance with the application context based on a first set of predefined rules, wherein the set of NFR recommendations is associated with a plurality of NFR types corresponding to a plurality of NFR categories;

generate a NFR model by identifying a set of applicable NFR categories from the plurality of NFR categories and a corresponding set of applicable NFR types based on a second set of predefined rules, wherein the NFR model generates a set of applicable NFR aspects corresponding to the set of applicable NFR categories;

generate a NFR weighable matrix, wherein plurality of elements of the NFR weighable matrix comprise a) weightage assigned to each NFR aspect from the set of applicable NFR aspects and b) quantifier defining rating in context of the weightage for each NFR aspect from the set of applicable NFR aspects in the NFR model of the application context, wherein the weightage is predefined user-modifiable value associated with each NFR aspects that defines criticality of each NFR aspect in the application context, and wherein the quantifier is user-modifiable measurement of each NFR aspect in the application context;

identify a set of NFR mitigations addressing each NFR aspect from the set of applicable NFR aspects using a NFR aspect to NFR Mitigation predefined mapping, wherein the set of NFR mitigations define a mitigation model and comprises a prioritized list of NFR mitigations derived based on a weighted set of applicable NFR aspects obtained by weighing the applicable NFR aspects by the NFR weighable matrix;

determine one or more contradictory NFR mitigations among the set of NFR mitigations, wherein the one or more contradictory NFR mitigations result from one or more contradictory NFR aspects present in the set of applicable NFR aspects, wherein the one or more contradictory NFR mitigations are obtained based on a predefined NFR mitigation to contradictory NFR mitigation mapping;

generate an optimized mitigation model for the set of applicable NFR aspects by addressing the one or more contradictory NFR mitigations to determine a set of optimized NFR mitigations;

generate an application code for the application using a set of application models by embedding the optimized mitigation model, wherein the set of application models are identified based on a set of functional requirements identified for the application;

generate a build specification for the application with the set of optimized NFR mitigations, wherein the build specification is a script that includes instructions to a) compile or translate a code for the application, b) perform quality checks on the application, c) perform tests to assess functional or non-functional conformance of the application, and d) enables the deployment of the final executable code; and build the code using the build specification by incorporating set of optimized NFR mitigations;

wherein the one or more hardware processors are configured to address one or more contradictory NFR mitigations resulting from the one or more contradictory NFR aspects present in the set of applicable NFRs to generate the optimized mitigation model providing the set of optimized NFR mitigations by: identifying one or more prioritized NFR mitigations from one or more contradictory NFR mitigations based on the relative criticality of the contradictory mitigations in the NFR type and a comparison of priorities and weightages for the contradictory NFR mitigations;

determining the set of NFR mitigations for the set of applicable NFRs;

identifying the one or more contradictory mitigations resulting from the one or more contradictory NFR aspects for the application context; and adding one or more non-contradictory mitigations to the set of NFR mitigations to generate the set of optimized NFR mitigations.

4. The system of claim 3, wherein the NFR model and the mitigation model is obtained based on information stored in a database, wherein the information comprises:

an exhaustive list of application domains, corresponding application categories and sub-categories and application types;

the plurality of NFR types, the plurality of NFR aspects corresponding to each of the plurality of NFR types and a plurality of NFR mitigations for each of the plurality of NFR aspects based on each of the plurality of application contexts;

weightages assigned to the plurality of NFR aspects corresponding to each of the plurality of application contexts; and one or more NFR mitigations corresponding to each of the plurality of NFR aspects.

5. One or more non-transitory machine-readable information storage mediums comprising one or more instructions, which when executed by one or more hardware processors causes a method for:

receiving, inputs from a user in accordance with a set of questions generated by an application context model to determine an application context among a plurality of application contexts of an application;

generating, a set of NFR recommendations for the application in accordance to the application context based on a first set of predefined rules, wherein the set of NFR recommendations is associated with a plurality of NFR types corresponding to a plurality of NFR categories;

generating, a NFR model by identifying a set of applicable NFR categories from the plurality of NFR categories and a corresponding set of applicable NFR types based on a second set of predefined rules, wherein the NFR model generates a set of applicable NFR aspects corresponding to the set of applicable NFR categories;

generating, a NFR weighable matrix, wherein plurality of elements of the NFR weighable matrix comprise a) weightage assigned to each NFR aspect from the set of applicable NFR aspects and b) quantifier defining rating in context of the weightage for each NFR aspect from the set of applicable NFR aspects in the NFR model of the application context, wherein the weightage is predefined user-modifiable value associated with each NFR aspects that defines criticality of each NFR aspect in the application context, and wherein the quantifier is user-modifiable measurement of each NFR aspect in the application context;

identifying, a set of NFR mitigations addressing each NFR aspect from the set of applicable NFR aspects using a NFR aspect to NFR Mitigation predefined mapping, wherein the set of NFR mitigations define a mitigation model and comprises a prioritized list of NFR mitigations derived based on a weighted set of applicable NFR aspects obtained by weighing the applicable NFR aspects by the NFR weighable matrix;

determining, one or more contradictory NFR mitigations among the set of NFR mitigations, wherein the one or more contradictory NFR mitigations result from one or more contradictory NFR aspects present in the set of applicable NFR aspects, wherein the one or more contradictory NFR mitigations are obtained based on a predefined NFR mitigation to contradictory NFR mitigation mapping;

generating, an optimized mitigation model for the set of applicable NFR aspects by addressing the one or more contradictory NFR mitigations to determine a set of optimized NFR mitigations;

generating, an application code for the application using a set of application models by embedding the optimized mitigation model, wherein the set of application models are identified based on a set of functional requirements identified for the application;

generating, a build specification for the application with the set of optimized NFR mitigations, wherein the build specification is a script that includes instructions to a) compile or translate a code for the application, b) perform quality checks on the application, c) perform tests to assess functional or non-functional conformance of the application, and d) enables the deployment of the final executable code; and building, the code using the build specification by incorporating set of optimized NFR mitigations;

wherein addressing one or more contradictory NFR mitigations resulting from the one or more contradictory NFR aspects present in the set of applicable NFRs to generate the optimized mitigation model providing the set of optimized NFR mitigations comprises:

identifying one or more prioritized NFR mitigations from one or more contradictory NFR mitigations based on the relative criticality of the contradictory mitigations in the NFR type and a comparison of priorities and weightages for the contradictory NFR mitigations;

determining the set of NFR mitigations for the set of applicable NFRs;

identifying the one or more contradictory mitigations resulting from the one or more contradictory NFR aspects for the application context; and adding one or more non-contradictory mitigations to the set of NFR mitigations to generate the set of optimized NFR mitigations.

6. The one of more non-transitory machine-readable information storage mediums of claim 5, wherein the NFR model and the mitigation model are obtained based on information stored in a database, wherein the information comprises:

an exhaustive list of application domains, corresponding application categories and sub-categories and application types;

the plurality of NFR types, the plurality of NFR aspects corresponding to each of the plurality of NFR types and a plurality of NFR mitigations for each of the plurality of NFR aspects based on each of the plurality of application contexts;

weightages assigned to the plurality of NFR aspects corresponding to each of the plurality of application contexts; and one or more NFR mitigations corresponding to each of the plurality of NFR aspects.

* * * * *